United States Patent
Rasool

(10) Patent No.: US 10,750,240 B2
(45) Date of Patent: Aug. 18, 2020

(54) DEVICES, SYSTEMS, AND METHODS FOR SELECTING MEDIA CONTENT BASED ON ADVERTISEMENT DETECTION

(71) Applicant: SLING MEDIA PVT LTD, Bengaluru (IN)

(72) Inventor: Mohammed Rasool, Bengaluru (IN)

(73) Assignee: SLING MEDIA PVT LTD, Bangaluru (IN)

( * ) Notice: Subject to any disclaimer, the term of this patent is extended or adjusted under 35 U.S.C. 154(b) by 0 days.

(21) Appl. No.: 15/974,955

(22) Filed: May 9, 2018

(65) Prior Publication Data

US 2019/0349634 A1     Nov. 14, 2019

(30) Foreign Application Priority Data

Dec. 15, 2017   (IN) .............................. 201741045139

(51) Int. Cl.
  *H04N 21/458*   (2011.01)
  *H04N 21/431*   (2011.01)
  *H04N 21/81*    (2011.01)
  *H04N 21/234*   (2011.01)

(52) U.S. Cl.
  CPC ... *H04N 21/4586* (2013.01); *H04N 21/23424* (2013.01); *H04N 21/4316* (2013.01); *H04N 21/812* (2013.01)

(58) Field of Classification Search
  CPC .. H04N 5/44543; H04N 21/482; H04N 21/84; H04N 21/4821; H04N 21/4345
  See application file for complete search history.

(56) References Cited

U.S. PATENT DOCUMENTS

| | | | |
|---|---|---|---|
| 7,103,906 B1 * | 9/2006 | Katz | H04N 7/173 725/87 |
| 2003/0018973 A1 * | 1/2003 | Thompson | H04N 7/16 725/47 |
| 2005/0120366 A1 * | 6/2005 | Thurbon | H04N 7/16 |
| 2010/0153995 A1 * | 6/2010 | Belz | H04N 21/482 725/39 |
| 2014/0189743 A1 * | 7/2014 | Kennedy | H04N 21/4668 |
| 2016/0192073 A1 * | 6/2016 | Poornachandran | H04R 5/04 |
| 2016/0255406 A1 * | 9/2016 | Soh | H04N 21/47214 |

* cited by examiner

*Primary Examiner* — Anthony Bantamoi
(74) *Attorney, Agent, or Firm* — Lorenz & Kopf LLP

(57) ABSTRACT

Devices, systems, and methods are provided for assisting user selection of media content viewed utilizing a media receiver. In an embodiment, the method includes the step or process of establishing whether high interest media content is currently displayed via the media receiver. If high interest media content is currently displayed via the media receiver, it is determined when user input is received causing the media receiver to display other media content following commencement of an advertisement set disrupting viewing of the high interest media content. When so determined, the media receiver then monitors for cessation of the advertisement set. If the media receiver does not resume display of the high interest media content prior to cessation of the advertisement set, the media receiver further performs at least one specified action in response to cessation of the advertisement set.

16 Claims, 3 Drawing Sheets

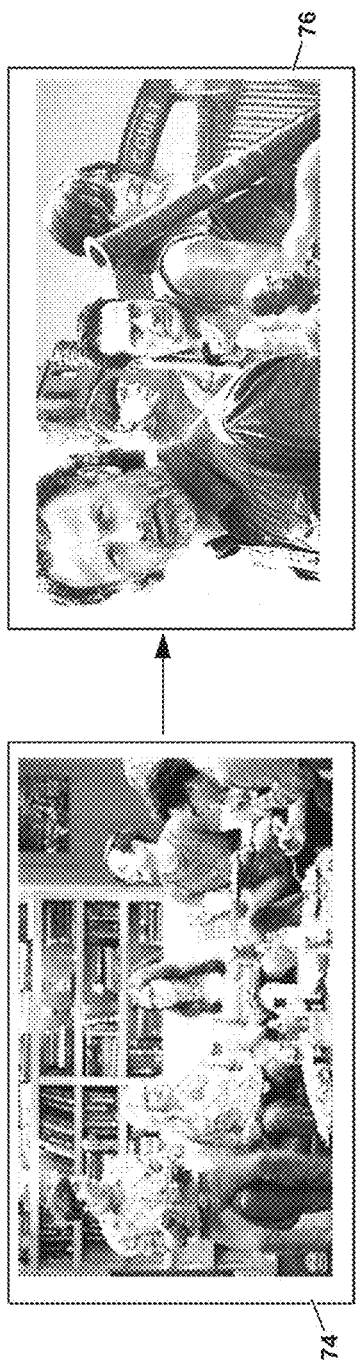
Automatically resume display of high interest media content (immediately or after countdown period w/o user cancellation)
FIG. 3
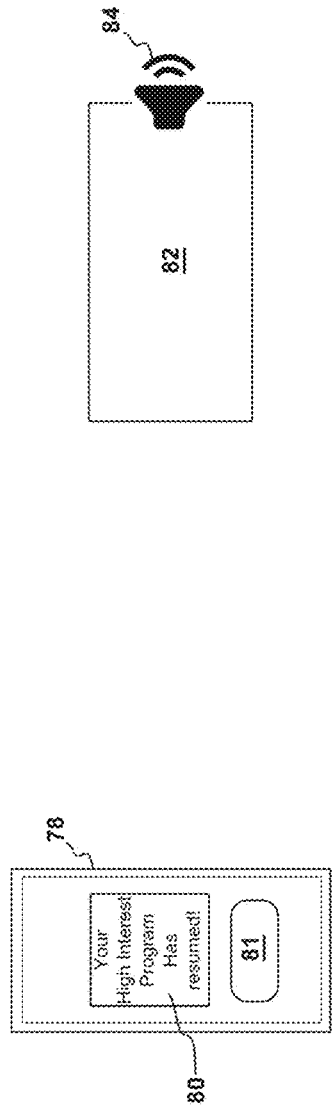
FIG. 4
Notification reminder presented on primary and/or secondary screen
FIG. 5
Audible message generated by, for example, client media receiver or home smart-speaker

DEVICES, SYSTEMS, AND METHODS FOR SELECTING MEDIA CONTENT BASED ON ADVERTISEMENT DETECTION

PRIORITY CLAIM

This application claims priority to India Provisional Application Serial No. 201741045130 filed on Dec. 15, 2017.

TECHNICAL FIELD

The present disclosure relates generally to techniques for selecting media content, and, more particularly, to methods for accommodating advertisements, such as commercial breaks interrupting television programming, in the selection and viewing of media content.

ABBREVIATIONS

Abbreviations appearing relatively infrequently in this document are defined upon initial usage, while abbreviations appearing more frequently in this document are defined below.
DVR—digital video recorder;
GUI—Graphical user interface;
I/O—Input/output;
OS—Operating system;
OTT—Over-the-top;
STB—Set-top box; and
TV—Television.

BACKGROUND

Often, a user viewing a particular TV show or other media content on a first channel will change the channel and begin viewing other media content on a second channel when an advertisement set begins on the first channel; the term "advertisement set" referring to a single advertisement or multiple advertisements presented in series as during, for example, a commercial break in TV programming. As a new channel has been selected and is now presented for viewing, the user may be unaware when the advertisement set concludes on the first channel. As a result, the user may return to the first channel only after the desired media content has resumed. Alternatively, the viewer might underestimate the time necessary for completion of the advertisement set and, thus, switch back to the first channel prematurely. The user may further engage in the frustrating practice of repeatedly returning to, briefly checking, and again switching away from the first channel, while awaiting conclusion of the advertisement set. In still other instances, the user might be distracted by other programming or some other task (e.g., as viewed or performed utilizing a tablet, smartphone, or other electronic device serving as a "second screen"), thereby increasing the likelihood that the user will inadvertently miss a portion of the initially-selected "high interest" programming.

While the placeshifting of media content can improve the convenience afforded to the end users in viewing media content, issues relating to the disruption of high interest media content by advertisement sets remain to a large extent. It is therefore desirable to provide devices, systems, and methods for alleviating such inconveniences when users change channels or otherwise navigate away from high interest media content in response to disruption of the media content by an advertisement set. These and other desirable features and characteristics will become apparent from the subsequent detailed description and the appended claims, taken in conjunction with the accompanying drawings and this background section.

BRIEF DESCRIPTION OF THE DRAWING FIGURES

Exemplary embodiments will hereinafter be described in conjunction with the following drawing figures, wherein like numerals denote like elements, and:

FIG. 3 depicts a first exemplary action suitably performed during the process of FIG. 2 in response to cessation of an advertainment set, namely, automatically resuming presentation of the high interest media content absent user instructions to the contrary;

Figure 2:
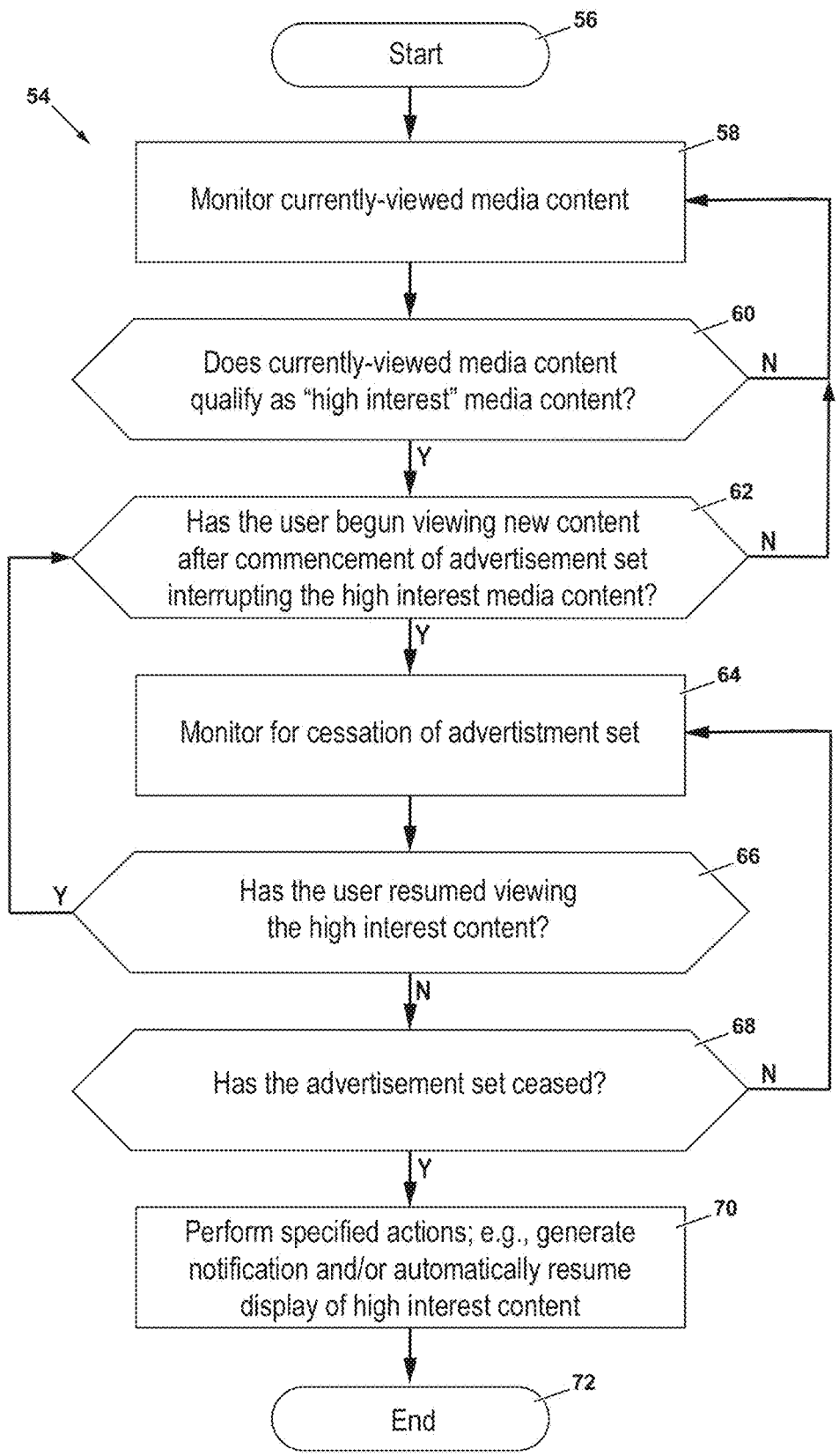
FIG. 2 is a flowchart of an exemplary process for performing specified actions upon cessation of an advertisement set, which has interrupted or disrupted viewing of high interest media content, as illustrated in accordance with various embodiments.

FIG. 4 schematically depicts a second exemplary action suitably performed during the process of FIG. 2 in response to cessation of an advertainment set, namely, the presentation of a message or other visual alert advising of the conclusion of the advertisement set; and FIG. 5 schematically depicts a third exemplary action suitably performed during the process of FIG. 2 in response to cessation of an advertisement set, namely, the generation of an audible message notifying an end user of the conclusion of the advertisement set.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Devices, systems, and methods are provided for determining when an advertisement set disrupts or temporarily prevents viewing of "high interest" media content and further for automatically performing certain actions in response to cessation of the advertisement set. As appearing herein, the term "advertisement set" refers to a single advertisement or a series of advertisements presented prior to or during media content desirably viewed by an end user. Actions suitably performed upon termination of an advertisement set may include, for example, the generation of a notification or an alert informing an end user that a particular advertisement set has concluded. Such notifications can be visual or audible in nature and delivered via the media receiver itself and/or any number and type of secondary electronic devices, which are operated by the end user and which communicate with the media receiver over a network. Examples of such secondary electronic devices include home smartspeakers and user-carried media receivers, such as smartphones and tablets, which serve as a "second screen" for viewing media content. In addition to or in lieu of such notifications, the media receiver may automatically resume display of the high interest media content upon advertisement cessation. This may involve returning to a particular channel presenting the high interest media content when the user views linear multi-channel TV programming; or, instead, bringing forward a browser player layer or streaming application window when viewing streaming media content.

Figure 1:
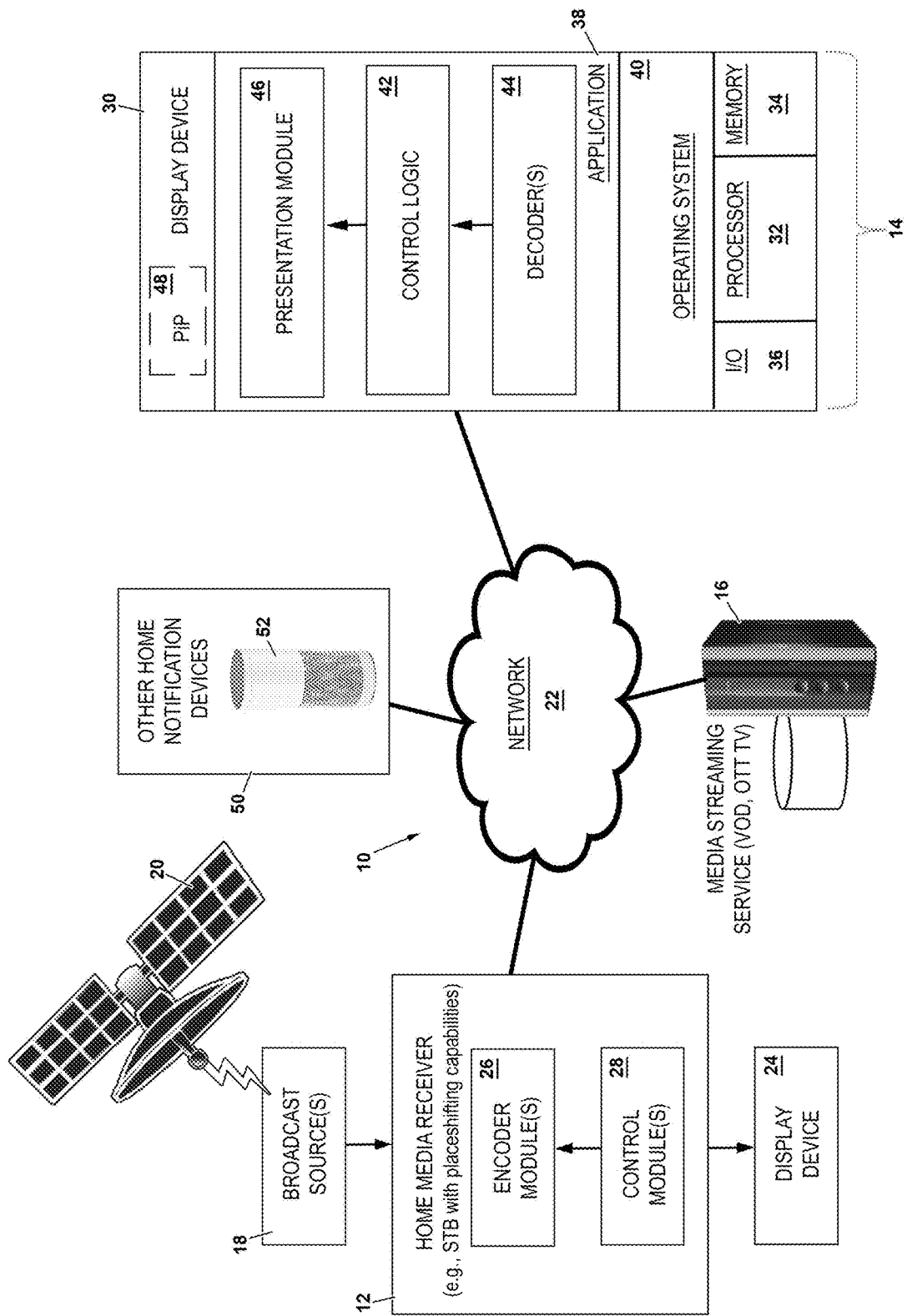
FIG. 1 is a schematic of a media transmission system including two media client receivers (e.g., a home media receiver and a portable media receiver, such as a smartphone or tablet) suitable for carrying-out embodiments of the present disclosure.

Turning now to the drawing figures, FIG. 1 schematically illustrates an exemplary media transmission architecture or system 10 suitable for carrying-out embodiments of the present disclosure. In the illustrated example, system 10 includes a home media receiver 12, a portable or user-carried media receiver 14, and at least one commercial media streaming service 16. Home media receiver 12 may assume the form of an STB, DVR, or a similar electronic device, which receives media content from one or more broadcast sources 18. For example, as indicated in FIG. 1, broadcast sources 18 may include a satellite 20, which provides a feed received by a non-illustrated satellite antenna further included in sources 18 and supplied to home media receiver 12. Additionally or alternatively, broadcast sources 18 may include cable TV delivery means, such as optical fiber or co-axial cable; and/or delivery of OTT TV through a data transmission network 22, such as the Internet. In still further embodiments, home media receiver 12 may be able to receive media content transmitted over network 22 and provided by, for example, media streaming (e.g., VOD) service 16 or another placeshifting device (not shown). Home media receiver 12 may receive, decode, and generate output signals for such media content, which may then be presented on a display device 24 (e.g., a home TV set or monitor) for viewing by an end user.

In contrast to home media receiver 12, portable media receiver 14 may be any portable electronic device capable of receiving streaming media content over network 22. In certain embodiments, receivers 12, 14 may communicate over network 22, with home media receiver 12 serving as a placeshifting device providing streaming content to portable media receiver 14. More specifically, in such implementations, home media receiver 12 (e.g., an STB located in a user's residence) may transmit streaming media content to portable media receiver 14 (e.g., a smartphone or tablet) for viewing by an end user. Media content may be initially recorded or stored in a memory accessible to home media receiver 12; e.g., a computer-readable storage area contained in receiver 12 or an external memory coupled to receiver 12 via a wired or wireless (home network) connection. Alternatively, the pertinent media content may be transmitted to home media receiver 12 and then placeshifted to portable media receiver 14 by receiver 12 as the media content is received. When providing such a placeshifting functionality, home media receiver 12 may further contain at least one encoder module 26 and control module 28. Modules 26, 28 can be implemented utilizing software, hardware, firmware, and combinations thereof. The encoded media stream generated by receiver 12 will typically contain both video and audio component streams, which may be combined with packet identification data. Any currently-known or later-developed packetized format can be employed by receiver 12 including, but not limited to, MPEG, QUICKTIME, WINDOWS MEDIA, and/or other formats suitable for streaming transmission over network 22.

The foregoing components can each be implemented utilizing any suitable number and combination of known devices including microprocessors, memories, power supplies, storage devices, interface cards, and other standardized components. Such components may include or cooperate with any number of software programs or instructions designed to carry-out the various methods, process tasks, encoding and decoding algorithms, and relevant display functions. Media transmission system 10 may also include various other conventionally-known components, which are operably interconnected (e.g., through network 22) and not shown in FIG. 1 to avoid unnecessarily obscuring the drawing. Network 22 may encompass any number of digital or other networks enabling communication between receiver 12, receiver 14, and/or media streaming service 16 utilizing common protocols and signaling schemes. Accordingly, network 22 can include one or more open Content Delivery Networks (CDNs), Virtual Private Networks (VPNs), the Internet, and various other networks implemented in accordance with TCP/IP protocol systems or other conventional protocols. Network 22 may also encompass one or more wired or Local Area Networks (LANS), Wide Area Networks (WANs), a cellular network, and/or any other pubic or private networks.

As indicated above, portable media receiver 14 can assume the form of any electronic device suitable for performing the processes and functions described herein. A non-exhaustive list of suitable electronic devices includes smartphones, wearable devices, tablet devices, laptop computers, and desktop computers. When engaged in a place-shifting session with home media receiver 12, portable media receiver 14 outputs visual signals for presentation on display device 30. Display device 30 can be integrated into portable media receiver 14 as a unitary system or electronic device. This may be the case when, for example, portable media receiver 14 assumes the form of a mobile phone, tablet, laptop computer, or similar electronic device having a dedicated display screen. Alternatively, display device 30 can assume the form of an independent device, such as a freestanding monitor or TV set, which is connected to portable media receiver 14 via a wired or wireless connection. Any such video output signals may be formatted in accordance with conventionally-known standards, such as S-video, High Definition Multimedia Interface (HDMI), Sony/Philips Display Interface Format (SPDIF), DVI (Digital Video Interface), or IEEE 1394 standards, as appropriate.

By way of non-limiting illustration, portable media receiver 14 is shown in FIG. 1 as containing at least one processor 32, an associated memory 34, and a number of I/O features 36. I/O features 36 can include various different types of interfaces, such as a network interface, an interface to mass storage, an interface to display device 30, and any number of user input interfaces. Portable media receiver 14 may execute a software program or browser player 38 directing the various hardware features of portable media receiver 14 to perform the functions described herein. Browser player 38 suitably interfaces with processor 32, memory 34, and I/O features 36 via any conventional OS 40 to provide such functionalities. Software application can be placeshifting application in embodiments in which home media receiver 12 assumes the form of a STB, DVR, or similar electronic device having placeshifting capabilities. In such embodiments, home media receiver 12 will typically be located within the residence of the end user, although this not strictly necessary. In certain realizations, portable media receiver 14 may be implemented utilizing special-purpose hardware or software, such as the SLINGCATCHER-brand products available from SLING MEDIA INC. currently headquartered in Foster City, Calif.

Browser player 38 includes control logic 42 adapted to process user input, obtain streaming content from one or more content sources, decode received content streams, and provide corresponding output signals to display device 30.

In this regard, control logic 42 may establish a data sharing connection with the remote home media receiver 12 enabling wireless bidirectional communication with control module 28 such that a placeshifting session can be established and maintained. During a placeshifting session, home media receiver 12 streams placeshifted content to portable media receiver 14 over network 22. Such streaming content can contain any visual or audiovisual programming including, but not limited to, streaming OTT TV programming and VOD content. The streaming content is received by portable media receiver 14 and decoded by decoding module 44, which may be implemented in hardware or software executing on processor 32. The decoded programming is then provided to a presentation module 46, which generates output signals to display device 30 for presentation to the end user operating portable media receiver 14. In some embodiments, presentation module 46 may combine decoded programming (e.g., programming from multiple streaming channels) to create a blended or composite image; e.g., as schematically indicated in FIG. 1, one or more Picture-in-Picture (PiP) images 48 may be superimposed over a main or primary image generated on a screen of display device 30.

In operation, control logic 42 of portable media receiver 14 obtains programming in response to end user input or commands received via a user interface, such as a touch-screen or keyboard interface, included within I/O features 36. Control logic 42 may establish a control connection with remotely-located home media receiver 12 via network 22 enabling the transmission of commands from control logic 42 to control module 28. Accordingly, home media receiver 12 may operate by responding to commands received from a portable media receiver 14 via network 22. Such commands may include information utilized to initiate a placeshifting session with home media receiver 12, such as data supporting mutual authentication of home media receiver 12 and portable media receiver 14. In embodiments in which home media receiver 12 assumes the form of a consumer placeshifting device, such as an STB or DVR located in an end user's residence, control commands may include instructions to remotely operate home media receiver 12 as appropriate to support the current placeshifting session.

Within continued reference to FIG. 1, media transmission system 10 can further include one or more home notification devices 50; that is, electronic devices located within a user's residence and capable of generating the below-described advertisement cessation notifications or alerts. In this regard, any number and type of home notification devices 50 can be leveraged to generate advertisement cessation notifications and, perhaps, to collect any desired user input in accordance with process 54, as described more fully below in conjunction with FIG. 2. As indicated in FIG. 1, home notification devices 50 can include a home smartspeaker 52, which is capable of data exchange with home media receiver 12 and portable media receiver 14 over network 22. Examples of commercially-available home smartspeakers suitable for usage as smartspeaker 42 include the AMAZON ECHO®, GOOGLE HOME®, and APPLE HOMEPOD® brand smartspeakers. Additional description of manners in which home smartspeaker 52 (and the smart home assistant programs carried-out thereby) can be leveraged to generate audible notifications, at appropriate junctures, informing an end user of the cessation of an advertisement set is further discussed below in conjunction with FIGS. 4-5.

Advancing to FIG. 2, there is shown an exemplary a process 54 (hereafter, "advertisement cessation monitoring process 54") for performing specified actions in response to the cessation of advertisement sets, which disrupt viewing of high interest media content. Advertisement cessation monitoring process 54 can be carried-out by any media receiver capable of performing the below-described process steps including the receipt and display media content; the term "display," utilized in this content, defined to encompass the generation of output signals by the media receiver containing media content for display on an independent display device, such as a freestanding TV set or monitor. Accordingly, and referring briefly once again to FIG. 1, advertisement cessation monitoring process 54 can be performed by home media receiver 12, by portable media receiver 14, or utilizing a combination thereof. Advertisement cessation monitoring process 54 includes a number of STEPS 56, 58, 60, 62, 64, 66, 68, 70, 72 described, in turn, below. The steps set-forth in FIG. 2 and described below are offered by way of non-limiting example only. In alternative embodiments of process 54, additional process steps may be performed, certain steps may be omitted, and/or the illustrated steps may be conducted in varying sequences.

Advertisement cessation monitoring process 54 commences at STEP 56. Process 54 may commence automatically (that is, without requiring user input), perhaps upon initial powering-up of the media receiver or when the media receiver begins displaying media content. Commencement of process 54 may also be dependent upon user-defined settings. For example, a user may be able to active and deactivate process 54, as desired, by interfacing with the media receiver in a suitable manner. In one embodiment, a user may specify whether process 54 is desirably carried-out by media receiver 14 by controlling an interface element (e.g., a virtual slider switch or similar widget) contain in an OPTIONS/SETTINGS page or menu accessible via the GUI of the media receiver. The user may also be permitted to specify the particular actions desirably performed in response to cessation of advertisement sets, as discussed more fully below.

After advertisement cessation monitoring process 54 commences, the media receiver advances to STEP 58 of process 54 and monitors the media content currently presented via the media receiver. The media receiver further analyses this content (e.g., on an iterative basis at a predestined refresh rate) to determine whether such content is properly identified as "high interest media content" (STEP 60). The particular manner in which the media receiver determines whether the currently-displayed media content is properly designated as "high interest media content" will vary among embodiments. Generally, however, the currently-displayed media content will be considered "high interest media content" when the media receiver establishes or concludes that a user intent exists to view the presently-displayed media content in its entirety or in its substantial entirety at the present juncture in time.

In determining whether the presently-displayed media content is "high interest media content" at STEP 60 of process 54, the media receiver may consider a pre-established user profile or other data describing user preferences. Such user preference data may be provided by the user in advance, whether via entry into the media receiver or into another database accessible to the receiver (e.g., via network 22 in FIG. 1) in embodiments. Such data may describe a user's general preferences, such as by genre, media type (e.g., movies, episodic series, sporting events, and so on), and timeliness, to list but a few examples. In other instances, a user may input data directly specifying particular media content items properly designated "high interest media content." In this latter regard, a user might enter data specify that a particular program (e.g., "The Walking Dead") and/or that particular seasons or episodes (e.g., all new showings or the season finale) of a program (e.g., "Episode 3.1 of The Walking Dead) should be identified as "high interest media content" during STEP 60 of process 54. Similarly, a user may provide user input instructing that all non-advertising content appearing on one or more designated channels (e.g., "HBO") should be identified as "high interest." As a still further example, a user may enter data instructing that sporting events of a particular type, featuring a particular athlete, featuring a particular sports team, or featuring a particular sports rivalry should be considered "high interest media content."

In further implementations, the media receiver carrying-out process 54 may infer or deduce user preferences when determining whether the currently-displayed media content is "high interest media content." In such implementations, a machine learning model (e.g., a neural network or other classification model) may be employed and trained utilizing appropriate data inputs. The data inputs can include, for example, measurements of similarity to other media content or information extracted from social media platforms (e.g., TWITTER®, FACEBOOK®, WHATSAPP®, and the like) and determined to interest or appeal to the end user. The machine learning model may be wholly implemented by the media receiver conducting process 54. Alternatively, such a machine learning model may be outsourced or "offboarded" to a remote computing entity (e.g., a cloud-based service or server farmer) in communication with the media receiver over a network (e.g., network 22 in FIG. 1). Regardless of whether user preference data is provided by an end user and/or inferred in some manner, the media receiver may further identify the particular end user presently utilizing the media receiver at STEP 60 of process 54 to ensure that the appropriate user profile is applied in embodiments in which multiple different users operate the media receiver. User data entry or biometric identifiers, such as facial imagery captured by a camera or fingerprint images captured utilizing a fingerprint reader integrated into a smartphone or remote control, can be utilized to this end.

In further embodiments of advertisement cessation monitoring process 54, the media receiver may determine whether the currently-displayed media content is "high interest media content" based upon user viewing behavior. For example, during STEP 60 of process 54, the media receiver may identify the currently-displayed media content as "high interest media content" if the user has viewed the media content on a repeated basis exceeding a predetermined number of times; e.g., as may be the case when the user is viewing the fourth episode of an episodic series for which the user has previously viewed the first, second, and third episodes. Additionally or alternatively, the media receiver may designate the currently-viewed content as "high interest media content" when the user has viewed the content (e.g., continuously) for a duration of time exceeding a minimum time threshold. In such embodiments, the minimum time threshold can be based upon a single instance or viewing of the media content; e.g., in the case of a movie or feature film, the currently-displayed media content may be considered "high interest" if viewed (e.g., continuously) for more than a specified time period of, for example, 0.5 hour. Comparatively, in the case of repeating or episodic media content, the minimum time threshold may be cumulative; e.g., the minimum time threshold for considering programming "high interest" may be surpassed when a user views more than 4.0 hours of an episodic series, considered cumulatively. The minimum time threshold may be configurable or adjustable by the end user utilizing a GUI or other suitable interface of the media receiver. Again, any combination and variations of the above-described approaches employed above may be employed to determine whether the currently-displayed media content is properly considered "high interest media content" during STEP 60 of process 54.

With continued reference to FIG. 2, if concluding that the currently-displayed media content is not "high interest" during STEP 60 of process 54, the media receiver returns to STEP 58 and continues to monitor the presently-displayed media content in the previously-described manner. Conversely, if determining that the currently-displayed media content properly qualifies as "high interest media content," the media receiver advances to STEP 62 of advertisement cessation monitoring process 54. During STEP 62, the media receiver determines when and if an end user begins viewing new or alternative content (e.g., by changing to a new channel or otherwise selecting new content to be displayed in lieu of the high interest content) following commencement of an advertisement set, which disrupts presentation of high interest media content. If answering this query in the negative, the media receiver again returns to STEP 58 and the above-described process steps repeat. If, instead, determining that a user has begun viewing new content after commencement of an advertisement set disrupting presentation of high interest media content, the media receiver advances to STEP 64 of process 54, as discussed below.

At STEP 64 of process 54, the media receiver commences monitoring for cessation or termination of the advertisement set, which as disrupted viewing of the high interest media content. As indicated in FIG. 2 at STEPS 66, 68 of process 54, the media receiver continues to monitor for cessation of the advertisement set until either: (i) the end user resumes viewing the high interest media content (STEP 66), in which case the media receiver returns to STEP 62 of process 54; or (ii) the advertisement set terminates or ceases (STEP 68), in which case the media receiver advances to STEP 70 of process 54. In various embodiments, the media receiver performs such an "advertisement detection" sub-process by monitoring for markers embedded in the content-containing signal (e.g., as contained in the packetized data stream or broadcast cable, satellite, or OTT television channel) indicating whether currently-displayed imagery corresponds to the content of interest or, instead, to commercial advertising. The Advanced Television Systems Committee (ATSC) has established standards requiring or recommending the inclusion of embedded markers or flags identifying advertising content in digital TV signals. In this case, the media receiver may monitor for the absence of such flags to determine when the current advertisement set is no longer displayed and presentation of the high interest content has resumed. In other instances in which data contained in the signal identifies the content at a particular juncture in time (e.g., packet identifiers in the case of streamed media content), the media receiver can utilize this information in determining when the presently-monitored advertisement set has terminated.

When advancing to STEP 70 of advertisement cessation monitoring process 54, the media receiver conducting process 54 (e.g., media receiver 12 or media receiver 14 shown in FIG. 1) performs certain predefined actions in response to cessation of the advertisement set. Such actions have been specified or predetermined to occur in response to the cessation of an advertisement set and may be adjustable by the end user through an OPTIONS/SETTINGS menu or page. In various embodiments, such responsive actions potentially include the automatic (that is, without requiring additional user input) resumption of display of the high interest media content. An example of such an action is generally presented in FIG. 3, which illustrates the automatic switching from second or alternative media content 76 to first or high interest media content 74. Specifically, in the context of linear multi-channel TV programming (e.g., delivered as cable, satellite, or OTT TV content), the media receiver may retune or otherwise return to the particular TV channel on which the high interest media content appears. Additionally or alternatively, various other actions can be performed in response to cessation of the advertisement set or content including, for example, the generation of notification alerts informing the end user that the advertisement set has concluded, as discussed more fully below in conjunction with FIGS. 4-5.

As previously stated, the media receiver may resume display of the high interest media content when advancing to STEP 74 of process 54. In this case, resumption of display of the high interest media content may be performed instantaneously or concurrently with detection of conclusion of the advertisement set. Alternatively, a countdown period may be initiated prior to resumption of display of the high interest media content; e.g., the media receiver may commence countdown of a predetermined time period (e.g., on the order of a few seconds), while visually indicating that the media receiver will return to display of the high interest media content absent user instructions to the contrary. To provide a more specific example, the high interest media content may be temporarily presented in a shared screen format, such as PiP image 48 shown in FIG. 1, along with a message indicating that the media receiver will return to previous channel showing the high interest media content (and, thus, show the high interest media content in full screen format) if the user does not cancel this operation within the predetermined time period. Similarly, when the high interest media content was viewed within a browser player or streaming application window that the user has minimized or at least partially covered with another window, the media receiver may atomically summon the window displaying the high interest media content to the forefront or top level display during STEP 70 of process 54.

Notably, in instances in which the media receiver determines that a user has switched to usage of another device serving as a "second screen" during the monitored advertisement set, playback or display of the high interest media content may be resumed at the second screen during STEP 70 of process 54. To provide a more detailed example, and with reference to FIG. 1, the user may initially begin viewing high interest media content via home media receiver 12 (e.g., an STB); and, following commencement of an advertisement set interrupting viewing of the high interest content at home media receiver 12, the user may switch to usage of portable media receiver 14 (e.g., a smartphone or tablet). In this case, home media receiver 12 may detect this occurrence (via signal exchange over network 22); and, at STEP 70 of process 54, transmit instructions to portable media receiver 14 (here, serving as a "second user-operated device") to begin display of the high interest media content upon cessation of the monitored advertisement set. In such embodiments, portable media receiver 14 may obtain the high interest media content directly from the content source without signal routing through receiver 14 (e.g., from streaming video server 16 as, for example, OTT TV received over network 22); or, instead, portable media receiver 14 may receive the high interest media content, as placeshifted (e.g., encoded, packetized, and transmitted) to receiver 14 from home media receiver 12.

In addition to or in lieu of automatically resuming display of the high interest media content, a notification or an alert can be generated during STEP 70 of process 54 informing an end user that the monitored advertisement set has concluded. Such notifications can be visual or audible in nature and delivered via the media receiver itself and/or any number and type of secondary electronic devices, which are operated by the end user and which communicate with the media receiver over a network. For example, in certain embodiments, the media receiver may simply output to the relevant display screen (e.g., display device 24 in the case of media receiver 12 or display device 30 in the case of media receiver 14), a visual indication that the monitored advertisement set has now terminated or concluded. Such a visual indication can be, for example, a textual annunciation stating that the user's high interest programming has resumed. Alternatively, such a message (or other visual cue) may be transmitted to a second user-operated device serving a "second screen," such as a user's smartphone or tablet; e.g., in an embodiment in which media receiver 12 and media receiver 14 (FIG. 1) assumes the form of an STB and a smartphone, respectively, receiver 12 may send a message (e.g., as a text message or push notification) to receiver 14 announcing that the monitored advertisement set has now terminated and display of the high interest content is resumed. FIG. 4 illustrates an example of such an alert or notification message 80 presented on a display device 78, which may correspond to display device 30 of media receiver 14 shown in FIG. 1. Additionally, in certain embodiments, a user interface element (e.g., a virtual button 81) may be generated in conjunction with message 80, which may be activated by the end user to resume display of the high interest media content.

In still further embodiments, the media receiver may provide an audible notification alerting the end user that the advertisement set has concluded during STEP 70 of process 54. This can be spoken message, whether spoke by a pre-recorded human voice or by a computer-generated voice; a dedicated chime; or any other audible signal suitable for notifying a user of the cessation of the advertisement set. Additionally or alternatively, the media receiver (e.g., home media receiver 12 or portable media receiver 14 shown in FIG. 1) may transmit instructions to another network-connected device, such as home smartspeaker 52 (further shown in FIG. 1), which then generates the audible advertisement cessation notification. This possibility is further illustrated in FIG. 5 wherein at least one device 82 is utilized to generate an audio alert 84, which notifies the user of cessation of the monitored advertisement set. Again, such an audible advisory message is conveniently generated utilizing home smartspeaker 52 in response to a command transmitted over network 22 by the media receiver executing method 50. If desired, smartspeaker 52 may allow and possibly further prompt the end user for the entry of spoken user input to cancel or effectuate resumption of display of the high interest media content; e.g., in an embodiment, smartspeaker 52 audibly inquires as to whether a user wishes to return to display of the high interest media content or, instead, whether the user wishes to cancel return to display of the high media content. When receiving audible user input instructing the media receiver to return (or not to return) to display of the high interest media content, smartspeaker 52 may then transmit the user instructions or command data over network 22 to the media receiver, which then acts accordingly.

There has thus been provided devices (media receivers) and methods for performing certain actions in response to cessation of an advertisement set, which disrupts end user viewing of media content considered "high interest." As described above, actions suitably performed upon termination of an advertisement set include the generation of an advertisement cessation notification, resumption of the display of the high interest media content, and various combinations thereof. Through the performance of such actions, the user viewing experience is enhanced by decreasing the likelihood that the user will inadvertently miss portions of high interest media content and by alleviating the need for the user to repeatedly check or return to a particular channel to determine when presentation of the high interest media content has resumed. The overall user experience in selecting and viewing media content is enhanced as a result.

In various embodiments, the above-described method for selecting media content includes the steps or processes of displaying first media content at a media device and determining that the first media content is designated as high interest media content. In response to a user request or input, the system or media receiver displays second media content at the media device. Advertisement detection is then performed with respect to the first media content to determine that the advertisement content associated with the first media content has terminated. When it is determined that the advertisement content has terminated, the system or media receiver then indicates to the user that the advertisement content has terminated. In certain embodiments, indicating to the user that the advertisement content has terminated includes or consists of resuming the receiving of the first media content automatically. In other embodiments, indicating to the user that the advertisement content has terminated includes or consists producing a warning or advisory message on a second media device. Finally, in at least some implementations, determining that the first media content is designated high interest media content includes training a machine learning model based on user behavior.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents. The term "exemplary" is used herein to represent one example, instance or illustration that may have any number of alternates. Any implementation described herein as exemplary is not necessarily to be construed as preferred or advantageous over other implementations.

What is claimed is:

1. A method performed by a media receiver for assisting a user in viewing media content utilizing the media receiver, the method comprising:
    establishing, by the media receiver, whether the media content currently displayed via the media receiver is high interest media content based upon a viewing history of the user, wherein the media content is determined to be high interest media content if the viewing history indicates that the user has previously watched multiple episodes of the media content;
    if high interest media content is currently displayed via the media receiver, the media receiver determining when and if the user begins viewing alternative media content after commencement of an advertisement set disrupting the high interest media content;
    upon the media receiver determining that the user has begun viewing alternative media content after commencement of an advertisement set disrupting the high interest media content, the media receiver monitoring the high interest media content for a cessation of the advertisement set to permit a return to viewing the high interest media content after a temporary absence; and
    if the media receiver has not resumed display of the high interest media content upon the cessation of the advertisement set, the media receiver automatically performing at least one specified action to permit the return to viewing of the high interest media content after the temporary absence at the cessation of the advertisement set, and otherwise not performing the at least one specified action to thereby provide an uninterrupted departure from the media content.

2. The method of claim 1 wherein the at least one specified action comprises the media device generating a visual notification, at the media receiver, alerting the user that the advertisement set has concluded.

3. The method of claim 1 wherein the at least one specified action comprises transmitting instructions from the media receiver, over a network, and to a second user-operated device to generate a visual notification alerting the user that the advertisement set has concluded.

4. The method of claim 1 wherein the at least one specified action comprises transmitting instructions from the media receiver, over a network, to a home smartspeaker to generate an audible notification alerting the user that the advertisement set has concluded.

5. The method of claim 1 wherein the at least one specified action comprises automatically resuming display of the high interest media content after cessation of the advertisement set.

6. The method of claim 5 wherein automatically resuming display of the high interest media content comprises returning to a television channel presenting the high interest media content after cessation of the advertisement set.

7. The method of claim 5 wherein the automatically resuming display of the high interest media content comprises bringing forward a browser player window utilized to view the high interest media content after cessation of the advertisement set.

8. The method of claim 1 wherein the establishing whether high interest media content is currently displayed via the media receiver comprises the media receiver:
    determining that the media content currently displayed via the media receiver is high interest media content if the viewing history indicates that the multiple episodes of the media content have been cumulatively displayed for more than a predetermined duration of time.

9. The method of claim 1 wherein the at least one specified action comprises automatically resuming display of the high interest media content on an electronic device other than the media receiver operated by the user.

10. A method executed by a media device for presenting media content, the method comprising:
    providing first media content by the media device for presentation to a viewer;
    determining, by the media device based upon a viewing history of the viewer, that the first media content is high interest media content, wherein the media content is determined to be high interest media content if the viewing history indicates that the user has previously watched multiple episodes of the media content;
    in response to a request received by the media device from the viewer during a commercial break of the first media content, the media device providing second media content that is different from the first media content for presentation to a viewer;

if the first media content is determined to be high interest media content, the media device performing automatic advertisement detection with respect to the first media content while the media device is presenting the second media content for presentation to the viewer to thereby determine when the commercial break of the first media content has terminated; and when it is determined that the advertisement content has terminated, the media device automatically tuning to the channel of the high interest media content to thereby restore presentation of the high interest media content after the temporary absence, and otherwise not tuning to the channel of the previously-viewed media content to thereby provide an uninterrupted departure from the media content.

11. A media receiver, comprising:

a processor; and a computer-readable storage medium storing a computer-executable code that, when executed by the processor, causes the media receiver to perform the operations of:

establishing whether the media content currently displayed via the media receiver is high interest media content based upon a viewing history of the user, wherein the media content is determined to be high interest media content if the viewing history indicates that the user has previously watched multiple episodes of the media content;

if high interest media content is currently displayed via the media receiver, the media receiver determining when and if the user begins viewing alternative media content after commencement of an advertisement set disrupting the high interest media content;

upon the media receiver determining that the user has begun viewing alternative media content after commencement of an advertisement set disrupting the high interest media content, the media receiver monitoring the high interest media content for a cessation of the advertisement set to permit a return to viewing the high interest media content after a temporary absence; and if the media receiver has not resumed display of the high interest media content upon the cessation of the advertisement set, the media receiver automatically performing at least one specified action to permit the return to viewing of the high interest media content after the temporary absence at the cessation of the advertisement set, and otherwise not performing the at least one specified action to thereby provide an uninterrupted departure from the media content.

12. The media receiver of claim 11 wherein the processor, when performing the at least one specified action, generates a visual notification alerting the user that the advertisement set has concluded.

13. The media receiver of claim 11 wherein the processor, when performing the at least one specified action, transmits instructions to a second user-operated device to generate a visual notification alerting the user that the advertisement set has concluded.

14. The media receiver of claim 11 wherein the processor, when performing the at least one specified action, transmits instructions to a home smartspeaker to generate an audible notification alerting the user that the advertisement set has concluded.

15. The media receiver of claim 11 wherein the processor, when performing the at least one specified action, automatically resumes display of the high interest media content after cessation of the advertisement set.

16. The media receiver of claim 11 wherein the processor, when establishing whether high interest media content is currently displayed via the media receiver, performs the processes of:

monitoring the media content currently displayed via the media receiver; and determining that the media content currently displayed via the media receiver is high interest media content if the media content is displayed for more than a predetermined duration of time.

* * * * *